US011196047B2

(12) United States Patent
Suzuki et al.

(10) Patent No.: US 11,196,047 B2
(45) Date of Patent: Dec. 7, 2021

(54) POSITIVE ELECTRODE ACTIVE MATERIAL FOR NON-AQUEOUS ELECTROLYTE SECONDARY BATTERY AND PROCESS FOR PRODUCING SAME, AND NON-AQUEOUS ELECTROLYTE SECONDARY BATTERY

(71) Applicant: SUMITOMO METAL MINING CO., LTD., Tokyo (JP)

(72) Inventors: Jun Suzuki, Ehime (JP); Koji Yamaji, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 25 days.

(21) Appl. No.: 15/706,326

(22) Filed: Sep. 15, 2017

(65) Prior Publication Data

US 2018/0090759 A1 Mar. 29, 2018

(30) Foreign Application Priority Data

Sep. 20, 2016 (JP) .............................. JP2016-182668

(51) Int. Cl.
| | | |
|---|---|---|
| *H01M 4/525* | (2010.01) | |
| *H01M 4/04* | (2006.01) | |
| *H01M 10/0525* | (2010.01) | |
| *H01M 4/1391* | (2010.01) | |
| *H01M 4/131* | (2010.01) | |
| *H01M 4/02* | (2006.01) | |

(52) U.S. Cl.
CPC ............. *H01M 4/525* (2013.01); *H01M 4/04* (2013.01); *H01M 4/131* (2013.01); *H01M 4/1391* (2013.01); *H01M 10/0525* (2013.01); *H01M 2004/028* (2013.01)

(58) Field of Classification Search
CPC ........ H01M 4/525; H01M 4/131; H01M 4/52; H01M 10/0525; H01M 2004/028; H01M 4/04; H01M 4/1391
See application file for complete search history.

(56) References Cited

U.S. PATENT DOCUMENTS

| | | | | |
|---|---|---|---|---|
| 5,989,744 A * | 11/1999 | Yamaura | ............... | H01M 4/525 |
| | | | | 429/223 |
| 6,241,959 B1 * | 6/2001 | Cho | ....................... | H01M 4/131 |
| | | | | 252/519.1 |
| 2016/0028072 A1 * | 1/2016 | Sakai | .................... | H01M 4/364 |
| | | | | 429/223 |

FOREIGN PATENT DOCUMENTS

| | | |
|---|---|---|
| JP | 2005-332713 A | 12/2005 |
| WO | 2012/164751 A1 | 12/2012 |

* cited by examiner

*Primary Examiner* — Carlos Barcena
(74) *Attorney, Agent, or Firm* — Oliff PLC (57) ABSTRACT

A positive electrode active material containing a lithium metal composite oxide composed of secondary particles formed by aggregated primary particles, comprising lithium, at least one metal element and at least one additive element, the lithium metal composite oxide having a crystal structure of layered rock salt structure and the metal element including nickel in a content of 60 to 90 atomic percent and the additive element including boron in content of more than 1.0 atomic percent and 6.0 atomic percent or less, the nickel content and the boron content each with respect to the sum of the metal element and the additive element, the porosity of the secondary particles being 8% or more and 20% or less; a non-aqueous electrolyte secondary battery containing the positive electrode active material; and a process for producing the positive electrode active material.

18 Claims, 6 Drawing Sheets

POSITIVE ELECTRODE ACTIVE MATERIAL FOR NON-AQUEOUS ELECTROLYTE SECONDARY BATTERY AND PROCESS FOR PRODUCING SAME, AND NON-AQUEOUS ELECTROLYTE SECONDARY BATTERY

BACKGROUND OF THE INVENTION

Field of the Invention

The present invention relates to a positive electrode active material for non-aqueous electrolyte secondary battery and process for producing same, and a non-aqueous electrolyte secondary battery. This application is based upon and claims the benefit of priority from prior Japanese Patent Application No. 2016-182668 filed on Sep. 20, 2016 in Japan, which is incorporated by reference herein.

Description of Related Art

In recent years, there has been a strong demand for the development of compact and lightweight secondary batteries having a high energy density due to the widespread use of portable electronic devices such as mobile phones and notebook computers. In addition, high capacity is also required in an environment-responsive automobile called XEV, so a demand for high capacity secondary battery is expected to increase significantly in future. Further, higher capacity is required as necessity is increasing for miniaturization and improvement of running distance per a battery charging in the environment-responsive automobile.

As such high capacity secondary batteries, there is non-aqueous electrolyte secondary battery. Further, as typical non-aqueous electrolyte secondary battery, there is lithium ion secondary battery, and for a positive electrode material of lithium ion secondary battery, lithium metal composite oxide is used as a positive electrode active material. Lithium cobalt composite oxide ($LiCoO_2$) is relatively easy to synthesize, and also, a 4 V-class high voltage can be achieved in lithium ion secondary battery using lithium cobalt composite oxide as the positive electrode material, so $LiCoO_2$ is practically used as a material for realizing the secondary battery having a high energy density.

However, it is hard to say that lithium cobalt composite oxide is responding sufficiently to a demand for high capacity, and an alternative material with higher capacity is being considered. Among a positive electrode active material able to replace lithium cobalt composite oxide, lithium nickel composite oxide ($LiNiO_2$) is catching the attention recently, as it is having high capacity, and also, advantageous in cost as expensive cobalt content is low.

However, lithium nickel composite oxide is having a problem that heat stability is low, as crystal structure collapses when charging, and heat generation and oxygen release tend to occur. In addition, in non-aqueous electrolyte secondary battery, organic solvent is used as electrolytic solution, so there is a problem that, when excess heat generation occurs, it tends to generate more heat by reacting with organic solvent, and these problems are prevented by improvement of the battery itself or additive element to lithium nickel composite oxide. Therefore, it cannot be said that advantages of lithium nickel composite oxide, which is having high capacity and inexpensive in cost, are utilized sufficiently.

In order to solve such problems, for example, in Patent Literature 1, a positive electrode material for secondary battery comprising a compound with chemical composition formula $A_{4-x}B(PO_4)_2$ as main component, wherein A is at least one type of element selected from alkaline metal, B is at least one type of element selected from transition metal which can be multivalent ion having a valency of two or more, and x is in a range of $0 \leq x \leq 4$, is proposed. It is described that, according to this proposal, it is possible to provide a positive electrode material having phosphoric acid skeleton structure with high safety, two or more dimensional lithium diffusion network, and high electric capacity of one or more electron reaction.

In addition, in Patent Literature 2, a positive electrode active material, which is lithium nickelate of a composition expressed by a general formula: $Li_x(Ni_{1-y}Co_y)_{1-z}M_zO_2$ (wherein $0.98 \leq x \leq 1.1$, $0.05 \leq y \leq 0.4$, $0.01 \leq z \leq 0.2$, M is one kind or two kinds or more selected from a group of Al, Mn, Ti and Mg), and having at least one structural property, in a state of SOC at least 50%, out of (1) a axis is 2.8 Å or more, (2) grid volume is 99.6 Å$^3$ or more, (3) Ni—O bond distance is 1.8 Å or more, (4) Ni—Ni bond distance is 2.8 Å or more, (5) Debye-Waller factor of Ni—O is 0.065 or more, and (6) Debye-Waller factor of Ni—Ni is 0.066 or less, is proposed. It is described that, according to this proposal, it is possible to provide a positive electrode active material with excellent structural stability (heat stability) and high discharge capacity (high energy density).

Patent Literature 1: WO 2012/164751 A
Patent Literature 2: JP 2005-332713 A

SUMMARY OF THE INVENTION

However, the positive electrode material disclosed in Patent Literature 1 is polyanion type positive electrode active material, so high electric capacity is expected, but realistically chargeable and dischargeable electric capacity is low, so it is hard to say that it is the positive electrode active material with high capacity. On the other hand, it is hard to say that the positive electrode active material disclosed in Patent Literature 2 is achieving the required high capacity sufficiently, and high heat stability and higher capacity is required.

The present invention is proposed considering the above problems, and purpose of the present invention is to provide new and improved positive electrode active material for non-aqueous electrolyte secondary battery capable of achieving high capacity when used as the positive electrode active material of non-aqueous electrolyte secondary battery, and also, capable of providing the positive electrode active material for non-aqueous electrolyte secondary battery with high heat stability, non-aqueous electrolyte secondary battery using the positive electrode active material, and a process for producing the positive electrode active material for non-aqueous electrolyte secondary battery.

One embodiment of the present invention is a positive electrode active material for non-aqueous electrolyte secondary battery containing lithium metal composite oxide composed of secondary particles formed by aggregated primary particles, comprising lithium, a metal element, and an additive element, wherein the lithium metal composite oxide is having crystal structure of layered rock salt structure and includes nickel as the metal element, and the nickel content is 60 to 90 atomic percent with respect to a sum of the metal element and the additive element, and also, the additive element is at least boron, and the boron content is more than 1.0 atomic percent and 6.0 atomic percent or less with respect to a sum of the metal element and the additive element, and further, a porosity of the secondary particles is 8% or more and 20% or less.

In addition, another embodiment of the present invention is non-aqueous electrolyte secondary battery comprising a positive electrode including the above positive electrode active material for non-aqueous electrolyte secondary battery.

In addition, another embodiment of the present invention is a process for producing a positive electrode active material for non-aqueous electrolyte secondary battery containing lithium metal composite oxide comprising lithium, a metal element, and an additive element, and nickel content as the metal element is 60 to 90 atomic percent with respect to a sum of the metal element and the additive element, and boron content as the additive element is more than 1.0 atomic percent and 6.0 atomic percent or less with respect to a sum of the metal element and the additive element, wherein the process comprising: a crystallization step including a step that mixed aqueous solution containing a metal salt element, which includes at least nickel salt, and a boron compound as the additive element, and aqueous solution containing ammonium ion are mixed to be reaction solution, and that pH of the reaction solution on the basis of a liquid temperature of 25° C. is controlled to be in a range of 11.0 to 12.5 using alkaline aqueous solution, and that, at that time, aqueous solution containing ammonium ion and alkaline aqueous solution are supplied into the reaction solution to grow particles of nickel composite hydroxide; a drying step for drying the crystallized nickel composite hydroxide after washing it; and a calcining step for obtaining lithium metal composite oxide by calcining in oxygen atmosphere a mixture obtained by mixing the dried nickel composite hydroxide and a lithium compound.

As explained in the above, according to the present invention, it is possible to obtain a positive electrode active material for non-aqueous electrolyte secondary battery capable of achieving high capacity, and also, with high heat stability. In addition, non-aqueous electrolyte secondary battery comprising a positive electrode including the positive electrode active material is having high capacity, and also, excellent in stability at high temperature.

DETAILED DESCRIPTION OF THE INVENTION

Hereinafter, explaining in detail about preferred embodiments of the present invention. In addition, the present embodiments explained in the below are not intended to unjustly limit the content of the present invention described in claims, and not all of the features explained in the present embodiments are always necessary as means for solving the problem of the present invention.

As a result of keen examination regarding improvement of heat stability and high capacity of a positive electrode active material for non-aqueous electrolyte secondary battery, the inventors have reached to the present invention by obtaining a knowledge that it is possible to achieve both high capacity and high heat stability by comprising boron for more than 1.0 atomic percent as additive element. Hereinafter, explaining about component and configuration of the positive electrode active material for non-aqueous electrolyte secondary battery relating to one embodiment of the present invention and about process for producing the same, by referring to the drawings, in the following order.

1. Positive electrode active material for non-aqueous electrolyte secondary battery
2. Process for producing positive electrode active material for non-aqueous electrolyte secondary battery
   2-1. Crystallization step
   2-2. Drying step
   2-3. Calcining step
3. Non-aqueous electrolyte secondary battery <1. Positive Electrode Active Material for Non-Aqueous Electrolyte Secondary Battery>

A positive electrode active material for non-aqueous electrolyte secondary battery relating to one embodiment of the present invention is a positive electrode active material for non-aqueous electrolyte secondary battery containing lithium metal composite oxide composed of secondary particles formed by aggregated primary particles, and comprising lithium, a metal element, and an additive element. In present embodiments, lithium metal composite oxide is having crystal structure of layered rock salt structure and includes nickel as the metal element, and nickel content is 60 to 90 atomic percent with respect to a sum of the metal element and the additive element, and also, the additive element is at least boron, and boron content is more than 1.0 atomic percent and 6.0 atomic percent or less with respect to a sum of the metal element and the additive element, and further, a porosity of secondary particles is 8% or more and 20% or less.

Lithium metal composite oxide composing the positive electrode active material for non-aqueous electrolyte secondary battery (Hereinafter, may be referred to only as "positive electrode active material".) is composed of secondary particles formed by aggregated primary particles, and having crystal structure of layered rock salt structure and includes nickel as the metal element, and nickel content is 60 to 90 atomic percent with respect to a sum of the metal element and the additive element. Such lithium metal composite oxide having crystal structure of layered rock salt structure, and with high nickel content, can achieve high charge and discharge capacity (Hereafter, may be referred to only as "battery capacity".) when used as non-aqueous electrolyte secondary battery (Hereinafter, may be referred to only as "battery".). On the other hand, stability of crystal structure is not high, so crystal structure becomes unstable at certain temperature and drastic heat generation tends to occur.

The positive electrode active material relating to one embodiment of the present invention includes boron as the additive element for more than 1.0 atomic percent and 6.0 atomic percent or less with respect to a sum of the metal element and the additive element.

The stability of crystal structure of lithium metal composite oxide with high nickel content is improved by adding boron for more than 1.0 atomic percent, and for example, even when a temperature rises in a charging state, in which the crystal structure tends to be unstable, a temperature zone in which heat generation of active material itself occurs becomes wider, so drastic heat generation at specific temperature does not occur, and heat stability is improved. When boron is added for more than 6.0 atomic percent, battery capacity will be decreased. In order to achieve both heat stability and battery capacity at a high level, it is preferable that boron content is 1.2 atomic percent or more and 5 atomic percent or less, more preferably, 1.5 atomic percent or more and 3 atomic percent or less.

In addition, the metal element and the additive element may further include elements other than the above elements, and for example, it is possible to use at least one kind of element selected from Co, Mn, Al, Mg, Si, Ti, Cr, Fe, Cu, Zn, Ca, V, Zr, Nb and W.

In addition, the primary particles of lithium metal composite oxide grow with preference to growth of crystal surface with more stable structure by addition of boron, so distinguished plate-like particles are formed. Therefore, the crystal structure of lithium metal composite oxide is stabilized, and high heat stability can be obtained.

Further, a porosity of the secondary particles is 8% or more and 20% or less, preferably 8% or more and 15% or less (Hereinafter, when there is no particular description, a range of numerical value means "lower limit or more and upper limit or less"). The primary particles are distinguished plate-like particles, so the secondary particles formed by the aggregated primary particles are having a structure with a lot of gaps. As the porosity is 8% or more, electrolytic solution permeates sufficiently into inside of the secondary particles, so movement between lithium and lithium metal composite oxide is promoted, and loss of battery capacity due to resistance of movement and else is inhibited, so battery capacity that lithium metal composite oxide inherently possesses is exerted sufficiently. Therefore, normally battery capacity is decreased by the addition of boron, but in the present invention, high battery capacity is maintained and it is possible to achieve both high heat stability and high battery capacity.

Here, the porosity of inside of the positive electrode active material can be found by analyzing an image (SEM image) observed by scanning electron microscope (Hereinafter, may be referred to as SEM.). For example, positive electrode active material particles (secondary particles) are embedded in a resin or the like, and SEM image is photographed in a state that sectional observation is possible by processing by cross section polisher or the like, and by using an image analysis software such as WinRoof 6.1.1 (product name), gaps are detected as black parts, and the porosity can be found by calculating a proportion of area of the black parts with respect to entire sectional area of secondary particle.

Average particle diameter of the lithium metal composite oxide is preferably 5 to 20 μm. By making the average particle diameter to be in the above range, filling property of the positive electrode active material is improved while maintaining battery capacity, and higher volume energy density can be obtained when it is used as a positive electrode of the battery. Here, the average particle diameter is D50, and it means a particle diameter that its cumulative volume will be 50% of volume of a sum of entire particles when accumulating a number of particles in each particle diameter from smallest particle diameter, and it can be measured using laser light diffraction scattering type particle size analyzer.

In addition, by including cobalt as the metal element, structure of lithium metal composite oxide is stabilized, and heat stability is more improved. From a point of view of achieving both battery capacity and heat stability at a high level, it is preferable that cobalt content is 3 to 20 atomic percent with respect to a sum of the metal element and the additive element included in lithium metal composite oxide. Lithium metal composite oxide such as lithium nickelate is having high energy density, but it cannot be said that heat stability is high, so in present embodiment, crystal structure is stabilized by adding cobalt and heat stability is improved.

Further, half-value breadth of exothermic peak of the positive electrode active material is preferably 20° C. or more, when measuring exothermic characteristics of the battery with respect to temperature as evaluation of heat stability, using differential scanning calorimeter (Hereinafter, may be referred to as "DSC".). When half-value breadth of exothermic peak is narrow, it indicates that drastic heat generation occurs, and when half-value breadth of exothermic peak is wide, it indicates that drastic heat generation tends not to occur and that crystal structure is being stable.

Heat stability evaluation by DSC can be performed by sampling the positive electrode active material, for example from 2032 type coin battery after battery characteristics evaluation, and by measuring the washed and dried positive electrode active material using DSC.

The positive electrode active material relating to one embodiment of the present invention achieves both battery capacity and heat stability at a high level by inhibiting a decrease of high battery capacity that lithium metal composite oxide with high nickel content possesses, and also, by improving heat stability, and initial discharge capacity when it is used as the positive electrode active material of non-aqueous electrolyte secondary battery, for example 2032 type coin battery, is 195 mAh/g or more, and high capacity of the battery can be achieved.

As such, the positive electrode active material relating to one embodiment of the present invention achieves both high battery capacity and high heat stability by the additive element as mentioned above, and for other powder properties, properties of standard positive electrode active material for non-aqueous electrolyte secondary battery can be applied.

<2. Process for Producing Positive Electrode Active Material for Non-Aqueous Electrolyte Secondary Battery>

Figure 1:
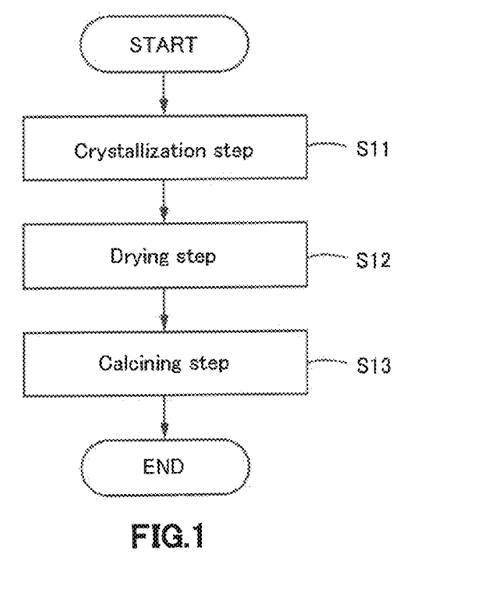
FIG. 1 is a flow chart schematically illustrating a process for producing a positive electrode active material for non-aqueous electrolyte secondary battery relating to one embodiment of the present invention.

FIG. 1 is a flow chart schematically illustrating a process for producing a positive electrode active material for non-aqueous electrolyte secondary battery relating to one embodiment of the present invention. A process for producing a positive electrode active material for non-aqueous electrolyte secondary battery relating to one embodiment of the present invention is the process for producing the positive electrode active material for non-aqueous electrolyte secondary battery containing lithium metal composite oxide comprising lithium, a metal element and an additive element. In the process for producing the positive electrode active material of the present embodiment, as illustrated in FIG. 1, it comprises a crystallization step S11, a drying step S12, and a calcining step S13. Hereinafter, explaining in detail about each step.

(2-1. Crystallization Step)

The crystallization step S11 comprises a step for growing nickel composite hydroxide by preparing reaction solution by mixing mixed aqueous solution containing a metal salt element, which includes at least nickel salt, and a compound of an additive element with aqueous solution containing ammonium ion, and by controlling such that pH of reaction solution on the basis of liquid temperature 25° C. will be in a range of 11.0 to 12.5 by using alkaline aqueous solution. By the crystallization step S11, nickel composite hydroxide (Hereinafter, may be referred to simply as "composite hydroxide".), which is a precursor of lithium metal composite oxide, can be obtained.

In the positive electrode active material relating to one embodiment of the present invention, the additive element is substituted with nickel atom of 3b site, so in a state of the composite hydroxide, it is preferable that the additive element is contained uniformly in the composite hydroxide in solid solution state or in a state that it is dispersed in particles of the composite hydroxide. Therefore, in the crystallization step S11, it is preferable to coprecipitate the additive element with hydroxide generated from metal salt. In the positive electrode active material for non-aqueous electrolyte secondary battery relating to one embodiment of the present invention, a compound of boron is at least used as the additive element. As the compound of boron, for example boric acid is preferable.

Composition of the composite hydroxide is inherited to the obtained positive electrode active material. Therefore, composition of the additive element and the metal salt element in mixed aqueous solution used when crystallizing the composite hydroxide should be similar to composition of the positive electrode active material to be obtained. By composition of the composite hydroxide, solid body may be generated when mixed by reacting in mixed solution. In this case, aqueous solution containing the metal salt element and the additive element may be supplied separately, such that composition in reaction solution will be composition of the composite hydroxide. In addition, in the case that composition is adjusted by coating metal salt composing the composite hydroxide to the crystallized hydroxide, it may be adjusted by subtracting an amount corresponding to metal salt to be coated from mixed aqueous solution.

Concentration of a sum of the metal element and the additive element in mixed aqueous solution is preferably 1.5 to 2.5 mol/L. From the above, it is possible to obtain the composite hydroxide with uniform composition by preventing deposition of the metal salt element and a compound of the additive element in mixed aqueous solution. In addition, it is possible to obtain high filling property by growing particle diameter sufficiently, and also, it is possible to stabilize particle diameter.

Reaction solution is controlled such that pH on the basis of liquid temperature 25° C. will be in a range of 11.0 to 12.5. By this feature, it is possible to grow particle diameter of the composite hydroxide to appropriate size, and it is possible to improve filling property of the obtained positive electrode active material. When pH is less than 11, or more than 12.5, particle diameter of the composite hydroxide becomes too small and filling property of the positive electrode active material will be decreased, or the composition becomes unstable, so it is not preferable as additive element may not be coprecipitated.

A temperature of reaction solution is constant in a range of 45 to 55° C., and for example, it is preferable to control upper and lower limit of the temperature within 5° C. By this feature, control of particle diameter of the composite hydroxide becomes easy. When the temperature of reaction solution is outside the above temperature range, composition becomes unstable, and oxidation tends to progress. In addition, when the temperature is less than 45° C., particle diameter may become too large, and when the temperature is more than 55° C., particle diameter may become too small. Therefore, in the present embodiment, the temperature of reaction solution is controlled to be in the above temperature range.

Ammonium ion concentration in reaction solution is preferably 5 to 25 mg/L, more preferably 5 to 15 mg/L. By this feature, it is possible to facilitate control of particle diameter by inhibiting change of particle diameter according to change of pH. In addition, it is possible to improve sphericity of the composite hydroxide, and it is possible to improve filling property of the positive electrode active material.

In the crystallization step S11, alkaline aqueous solution and aqueous solution containing ammonium ion are supplied directly into reaction solution. For example, a supply tube is inserted into reaction solution and alkaline aqueous solution is supplied into reaction solution. By this feature, change of ammonium ion concentration and local pH are inhibited, and distribution of boron becomes uniform, and also, particle growth is stabilized. By this feature, primary particles of the composite hydroxide is promoted to be plate-like particles by addition of boron, and the positive electrode active material obtained with the composite hydroxide as its precursor can have particle structure that plate-like particles are developed.

Figure 2A:
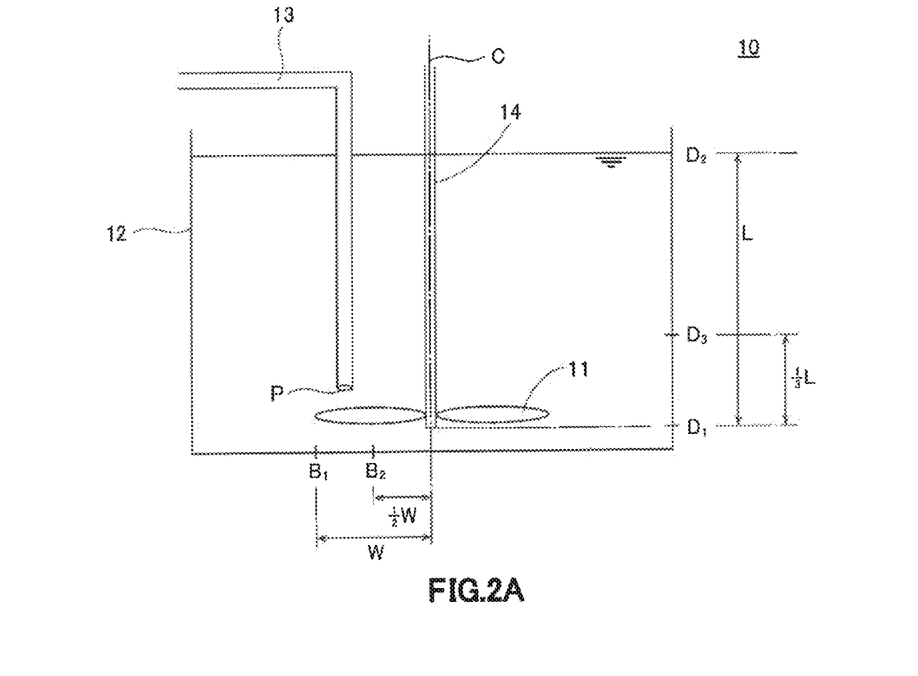
FIGS. 2A and 2B are views for explaining positions for supplying alkaline aqueous solution and aqueous solution containing ammonium ion in the process for producing the positive electrode active material for non-aqueous electrolyte secondary battery relating to one embodiment of the present invention.
Figure 2B:
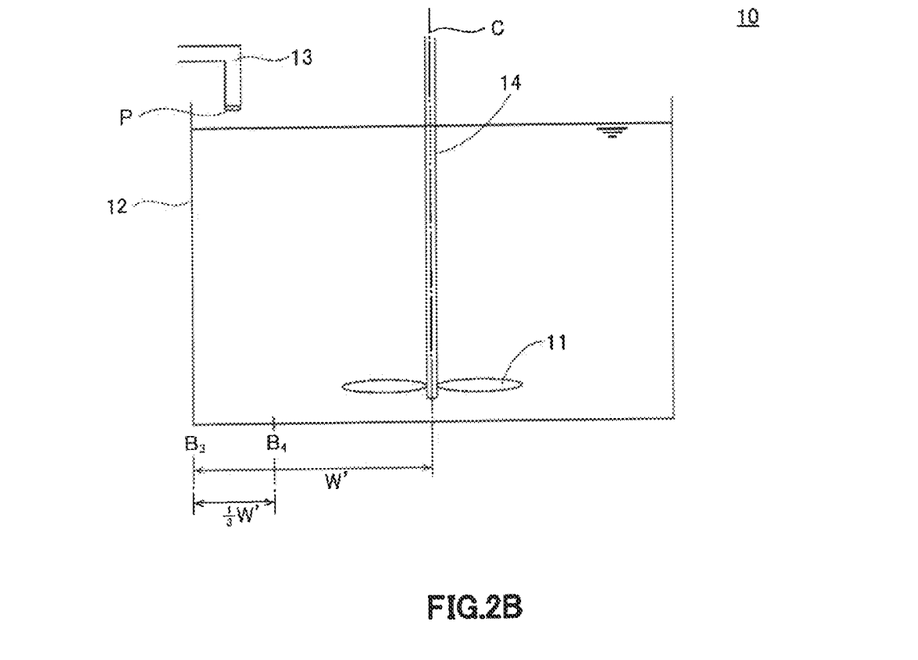

FIG. 2A is a view for explaining an embodiment of a position P for supplying alkaline aqueous solution and aqueous solution containing ammonium ion (for example, from supply tube 13) in the process for producing the positive electrode active material for non-aqueous electrolyte secondary battery relating to one embodiment of the present invention. In order not to occur local high concentration as possible, the position P for supplying alkaline aqueous solution and aqueous solution containing ammonium ion is preferably located between deepest part $D_1$ of stirring blade 11 in reaction solution and a position $D_3$ at one third of a distance L between deepest part $D_1$ of stirring blade 11 and liquid surface $D_2$ of reaction solution from deepest part $D_1$ of stirring blade 11, in vertical direction (in other words, between $D_1$ and $D_3$ in FIG. 2A), and preferably located between outermost periphery $B_1$ of stirring blade 11 and an intermediate position $B_2$ of a center C and outermost periphery $B_1$ of stirring blade 11, in horizontal direction (in other words, between $B_1$ and $B_2$ in FIG. 2A). By this feature, it is possible to supply alkaline aqueous solution and aqueous solution containing ammonium ion at a position where flow rate is fastest among vicinity of stirring blade 11 where flow rate of reaction solution is fast, so it is possible to obtain excellent composite hydroxide by inhibiting formation of local high concentration region.

n addition, it is also possible to inhibit change of ammonium ion concentration and local pH, by supplying alkaline aqueous solution and aqueous solution containing ammonium ion at liquid surface of reaction solution where flow rate is fast. FIG. 2B is a view for explaining an embodiment of a position P for supplying alkaline aqueous solution and aqueous solution containing ammonium ion (for example, from supply tube 13) in the process for producing the positive electrode active material for non-aqueous electrolyte secondary battery relating to other embodiment of the present invention. In other embodiment of the present invention, distribution of boron becomes uniform and particle growth is stabilized, by supplying alkaline aqueous solution and aqueous solution containing ammonium ion at liquid surface between outer periphery 12 ($B_3$) of liquid surface of reaction solution and a position $B_4$ at one third of a distance between a center C and outer periphery 12 ($B_3$) of liquid surface from outer periphery 12 ($B_3$) of liquid surface (in other words, between $B_3$ and $B_4$ in FIG. 2B).

In order to inhibit change of ammonium ion concentration and local pH further, it is preferable to arrange stirring blade 11 for stirring reaction solution and its shaft 14 at a central axis C of a reaction vessel 10 used for crystallization. By this feature, reaction solution in the reaction vessel is stirred uniformly and change of concentration is further inhibited.

In addition, it is possible to contain the additive element in the composite hydroxide more uniformly by inhibiting oxidation of the additive element, so it is preferable to keep oxygen concentration in reaction solution low. It is possible to inhibit oxidation by preventing infiltration of oxygen from outside of the reaction vessel, for example by introducing inert gas at liquid surface of reaction solution in the reaction vessel to seal the reaction vessel or to be positive pressure. Further, by inhibiting oxidation, particle density of the composite hydroxide improves, so it is preferable as the positive electrode active material with high energy density can be obtained.

(2-2. Drying step)

A drying step S12 is a step for drying crystallized nickel composite hydroxide after washing it. The obtained composite hydroxide contains impurities, so it is solid-liquid separated, washed by water, preferably by ion exchanged water, to remove impurities contained in the composite hydroxide such as sodium or sulfuric acid ion. In order to remove impurities of oxoacid ion such as sulfuric acid ion, it may be washed by alkaline aqueous solution. Then, it is preferably dried at a temperature in a range of 110 to 150° C. Drying temperature and drying time may be to the extent that moisture can be removed.

In addition, it is preferable to further comprise a heat treatment step for converting the composite hydroxide into nickel composite oxide (Hereinafter, may be referred simply as "composite oxide".) by heating the composite hydroxide after drying by the drying step S12 to a temperature in a range of 600 to 800° C. By this heat treatment, it is possible to promote reaction with lithium compound by inhibiting generation of water vapor at following calcining step S13, and also, it is possible to stabilize a ratio of lithium and a sum of the metal element and the additive element in the positive electrode active material. Further, it is possible to diffuse the additive element uniformly in the composite oxide to be able to achieve a state that it is sufficiently substituted with nickel atom of 3b site when the positive electrode active material is obtained.

When heat treatment temperature at the heat treatment step is less than 600° C., conversion into the composite oxide becomes insufficient, and also, it may not be in a state that the additive element is diffused uniformly in the composite oxide. On the other hand, when heat treatment temperature is more than 800° C., coarse particles may be generated as particles themselves of the composite oxide are sintered. In addition, a lot of energy is required, so it is not appropriate industrially. In addition, atmosphere to perform heat treatment is not limited particularly, and it may be non-reducing atmosphere containing oxygen, but it is preferable to perform in air atmosphere as it can be performed easily.

In addition, heat treatment time may be a time enables sufficient conversion into the composite oxide, and 1 to 12 hours is preferable. Further, a facility used for heat treatment is not limited particularly, and it may be any facility as long as it is possible to heat the composite hydroxide in non-reducing atmosphere containing oxygen, preferably in air atmosphere, and electric furnace or the like without generation of gas is preferably used.

(2-3. Calcining Step)

A calcining step S13 is a step for obtaining lithium metal composite oxide by calcining in oxygen atmosphere a mixture obtained by mixing dried nickel composite hydroxide and a lithium compound. In the present embodiment, the lithium compound and the composite hydroxide or the composite oxide are mixed such that a ratio (Li/Me) of number of atoms of lithium (Li) to a sum of number of atoms of the metal element and the additive element in the mixture (Me) is preferably 0.98 to 1.15, more preferably 1.01 to 1.09. That is, Li/Me does not change before and after the calcining step, so Li/Me mixed at this mixing step will be Li/Me in the positive electrode active material, so it is mixed such that Li/Me in the mixture will be same as Li/Me in the positive electrode active material to be obtained.

By mixing such that a ratio of Li/Me will be 1.01 to 1.09, crystallization is promoted, and substitution of the additive element with nickel atom of 3b site is further promoted. When this ratio of Li/Me is less than 1.01, lithium may remain as it does not react with a part of oxide and sufficient battery performance may not be obtained. On the other hand, when the ratio of Li/Me is more than 1.09, sintering is promoted, and particle diameter and crystallite diameter becomes large and sufficient battery performance may not be obtained.

Lithium compound used for forming lithium mixture is not limited particularly, but for example, lithium hydroxide, lithium nitrate, lithium carbonate, or mixture thereof is preferable as they are available easily. Especially, it is preferable to use lithium hydroxide or lithium carbonate considering stability of quality and easiness of handling. Lithium hydroxide is having high reactivity with the composite oxide, so crystallization is promoted and substitution of the additive element with nickel atom of 3b site is further promoted.

In addition, it is preferable that lithium mixture is mixed sufficiently before calcining. When mixing is insufficient, Li/Me becomes uneven between respective particles, and there is a possibility that a problem arises such as sufficient battery characteristics cannot be obtained, so it is necessary to mix sufficiently before calcining.

In addition, standard mixer can be used for mixing, and for example, shaker mixer, Loedige mixer, Julia mixer, V blender or the like can be used, and composite oxide particles and material containing lithium may be mixed sufficiently to the extent that shape of heat treatment particles will not be destroyed Next, the mixture is calcined in oxygen atmosphere, i.e. atmosphere containing oxygen, to obtain lithium metal composite oxide. Calcining temperature at this time is preferably 650 to 950° C., and more preferably 700 to 800° C. By this feature, crystallinity becomes high, and substitution is promoted. Especially, when calcining temperature is 700 to 800° C., cation mixing is inhibited and it is possible to make crystallinity higher, so it is preferable.

When calcining temperature is less than 650° C., diffusion of lithium into heat treatment particles is not performed sufficiently, so excess lithium or unreacted particles remain, or crystal structure will not be prepared sufficiently, and sufficient battery characteristics may not be obtained when used for the battery. On the other hand, when calcining temperature is more than 950° C., sintering occur drastically between composite oxide particles, and also, there is a possibility that abnormal particle growth occurs. When abnormal particle growth occurs, particles after calcining become coarse particles, and specific surface area will be decreased, so when used for the battery, a problem arises such that battery capacity is decreased as resistance of the positive electrode rises.

In addition, calcining time is preferably at least 4 hours or more, and more preferably 6 to 10 hours. When calcining time is less than 4 hours, lithium metal composite oxide may not be generated sufficiently.

When using lithium hydroxide as lithium compound, it is preferable to temporarily calcine by maintaining lithium mixture at a temperature lower than the calcining temperature, and also, in a range of 350 to 800, preferably 450 to 780 for about 1 to 10 hours, preferably 3 to 6 hours, before calcining lithium mixture. In other words, it is preferable to temporarily calcine at a reaction temperature of the composite oxide and lithium hydroxide or lithium carbonate. In this case, by maintaining at the reaction temperature of lithium hydroxide or lithium carbonate, lithium hydroxide will be dissolved and lithium diffuses into inside of the composite oxide sufficiently, so it is possible to obtain lithium metal composite oxide, which is uniform and with high crystallinity, and it is possible to promote substitution of the additive element.

Atmosphere at the time of calcining is an atmosphere containing oxygen, i.e. oxidizing atmosphere. It is preferably a mixed atmosphere of inert gas and oxygen with oxygen concentration 18 to 100 volume %. In other words, calcining is preferably performed in air or in oxygen stream. When oxygen concentration is less than 18 volume %, there is a possibility that crystallinity of lithium metal composite oxide will be insufficient. Therefore, calcining in air atmosphere is easy and more preferable.

In addition, a furnace to be used for calcining is not limited particularly, and any furnace may be used as long as it can heat the mixture in air or in oxygen stream, but from a point of view of maintaining atmosphere in the furnace uniformly, an electric furnace without generation of gas is preferable, and either batch type electric furnace or continuous electric furnace can be used.

In addition, lithium nickel composite oxide obtained by calcining may be occurring aggregation or minor sintering. In such cases, it can be disintegrated, and by disintegration, lithium metal composite oxide, i.e. the positive electrode active material relating to one embodiment of the present invention can be obtained. In addition, disintegration means an operation to loosen aggregate by separating secondary particles almost without destroying secondary particle itself, by charging mechanical energy to aggregate composed of plurality of secondary particles generated by sintering necking between secondary particles or the like at the time of calcining.

<3. Non-Aqueous Electrolyte Secondary Battery>

Non-aqueous electrolyte secondary battery relating to one embodiment of the present invention comprises a positive electrode containing a positive electrode active material for non-aqueous electrolyte secondary battery relating to one embodiment of the present invention, a negative electrode and non-aqueous electrolytic solution and else, and configuration of the battery itself is configured by the components similar to standard non-aqueous electrolyte secondary battery. Hereinafter, explaining in detail about each component of non-aqueous electrolyte secondary battery relating to one embodiment of the present invention.

(a) Positive Electrode

A positive electrode of non-aqueous electrolyte secondary battery is produced, for example as follows, by using the positive electrode active material for non-aqueous electrolyte secondary battery relating to one embodiment of the present invention.

At first, powdery positive electrode active material, conductive material, and binding agent are mixed, and activated carbon and solvent for a purpose of viscosity adjustment or the like is added according to need, and these materials are kneaded to produce positive electrode mixture paste. Mixing ratio of each material in this positive electrode mixture paste will be an important factor for determining a performance of non-aqueous electrolyte secondary battery. When total mass of solid content of positive electrode mixture excluding solvent is 100 parts by mass, it is preferable to adjust content of positive electrode active material to 60 to 95 parts by mass, and to adjust content of conductive material to 1 to 20 parts by mass, and to adjust content of binding agent to 1 to 20 parts by mass, as well as a positive electrode of standard non-aqueous electrolyte secondary battery.

Obtained positive electrode mixture paste is applied, for example on surface of current collector made of aluminum foil, and dried to scatter solvent. In addition, it may be pressed by roll press or the like, in order to increase electrode density according to need. As such, sheet-like positive electrode can be produced. The sheet-like positive electrode can be provided for production of the battery by cutting or the like into appropriate size according to the aimed battery. However, a process for producing the positive electrode is not limited to the above process, and other process may be used.

When producing the positive electrode, as conductive material, it is possible to use, for example graphite such as natural graphite, artificial graphite or expanded graphite, or carbon black material such as acetylene black or Ketjen black.

Binding agent serves a function to bind positive electrode active material particles, and for example, polyvinylidene fluoride (PVDF), polytetrafluoroethylene (PTFE), fluoro-rubber, ethylene propylene diene rubber, styrene butadiene, cellulose resin, polyacrylic acid or the like can be used.

In addition, according to need, solvent for dissolving binding agent and for dispersing positive electrode active material, conductive material and activated carbon may be added to positive electrode mixture. As solvent, it is possible to use organic solvent such as N-methyl-2-pyrrolidone concretely. In addition, in positive electrode mixture, it is possible to add activated carbon, in order to increase electric double layer capacity.

(b) Negative Electrode

Negative electrode mixture in the form of paste is prepared by mixing binding agent to negative electrode active material capable of occluding and desorbing lithium ion, or metal lithium, lithium alloy or the like, and by adding appropriate solvent, and negative electrode mixture paste is applied on surface of metal foil current collector such as copper, and dried, and compressed to increase electrode density according to need to form a negative electrode to be used.

As negative electrode active material, it is possible to use, for example natural graphite, artificial graphite, organic compound calcined body such as phenol resin, and powder body of carbon material such as coke. In this case, as binding agent for the negative electrode, it is possible to use fluorine containing resin such as PVDF, as well as binding agent for the positive electrode, and as solvent for dispersing these negative electrode active material and binding agent, it is possible to use organic solvent such as N-methyl-2-pyrrolidone.

(c) Separator

A separator is arranged to be interposed between the positive electrode and the negative electrode. The separator separates the positive electrode and the negative electrode to retain electrolyte, and thin film of polyethylene, polypropylene or the like having numerous fine holes can be used as the separator.

(d) Non-Aqueous Electrolytic Solution

Non-aqueous electrolytic solution is electrolytic solution dissolving lithium salt as supporting salt in organic solvent. As organic solvent, it is possible to use one kind solely or by mixing two kinds or more selected from: cyclic carbonate such as ethylene carbonate, propylene carbonate, butylene carbonate, or trifluoro propylene carbonate; chain carbonate such as diethyl carbonate, dimethyl carbonate, ethyl methyl carbonate, or dipropyl carbonate; ether compound such as tetrahydrofuran, 2-methyl tetrahydrofuran, or dimethoxyethane; sulfur compound such as ethyl methyl sulfone or butane sultone; and phosphor compound such as triethyl phosphate or trioctyl phosphate.

As supporting salt, it is possible to use $LiPF_6$, $LiBF_4$, $LiClO_4$, $LiAsF_6$, $LiN(CF_3SO_2)_2$ and combined salt thereof. Further, non-aqueous electrolytic solution may contain radical scavenger, surfactant, flame retardant or the like.

(e) Configuration and Shape of Battery

A shape of non-aqueous electrolyte secondary battery relating to one embodiment of the present invention composed of the positive electrode, the negative electrode, the separator and non-aqueous electrolytic solution as explained above may be various shapes such as cylindrical or layered shape. Even when non-aqueous electrolyte secondary battery is adopting any kind of shape, the positive electrode and the negative electrode are laminated via the separator to form electrode body, and the obtained electrode body is impregnated with non-aqueous electrolytic solution, and positive electrode current collector and positive electrode terminal communicating to outside are connected using current collecting lead, and also, negative electrode current collector and negative electrode terminal communicating to outside are connected using current collecting lead, and battery case is sealed to complete non-aqueous electrolyte secondary battery.

(f) Characteristics

Non-aqueous electrolyte secondary battery using the positive electrode active material relating to one embodiment of the present invention is having high capacity and excellent in heat stability. Especially, non-aqueous electrolyte secondary battery using the positive electrode active material relating to one embodiment of the present invention obtained by more preferable form can obtain high initial discharge capacity of more than 195 mAh/g, and can have higher capacity, for example when used as a positive electrode of 2032 type coin battery. In addition, oxygen discharge from the positive electrode active material is inhibited, so it will be excellent in safety and having high heat stability.

EXAMPLES

Hereinafter, a positive electrode active material for non-aqueous electrolyte secondary battery relating to one embodiment of the present invention will be described in more detail with reference to examples, but the present invention is not limited to these examples.

(1) Analysis of composition: It was measured by ICP emission spectrometry.

(2) Average particle diameter D50: It was performed by laser diffraction scattering type particle size distribution measuring device (Microtrac HRA made by NIKKISO CO., LTD.).

(3) Porosity: The positive electrode active material (secondary particles) was embedded in a resin, and by cross section polisher processing, it was in a state capable of cross-sectional observation by scanning electron microscope (SEM). SEM image of cross section was photographed, and by using an image analysis software such as WinRoof 6.1.1 (product name), gaps are detected as black part, and porosity can be found by calculating a proportion of area of black part with respect to sectional area of entire secondary particle. Further, 20 cross sections of secondary particles with more than 80% of average particle diameter D50 were selected randomly, and porosity of cross sections of these secondary particles were measured respectively, and average porosity, which is mean value thereof, was used as porosity of the positive electrode active material.

(4) Initial discharge capacity: It was performed by the following battery capacity evaluation process.

(Battery Capacity Evaluation)

Figure 3A:
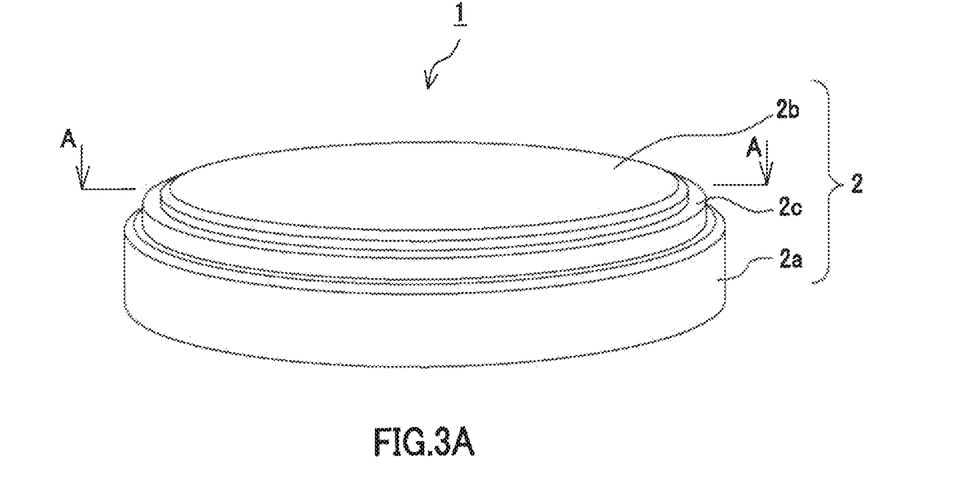
FIGS. 3A and 3B are block diagrams of non-aqueous electrolyte secondary battery relating to one embodiment of the present invention.
Figure 3B:
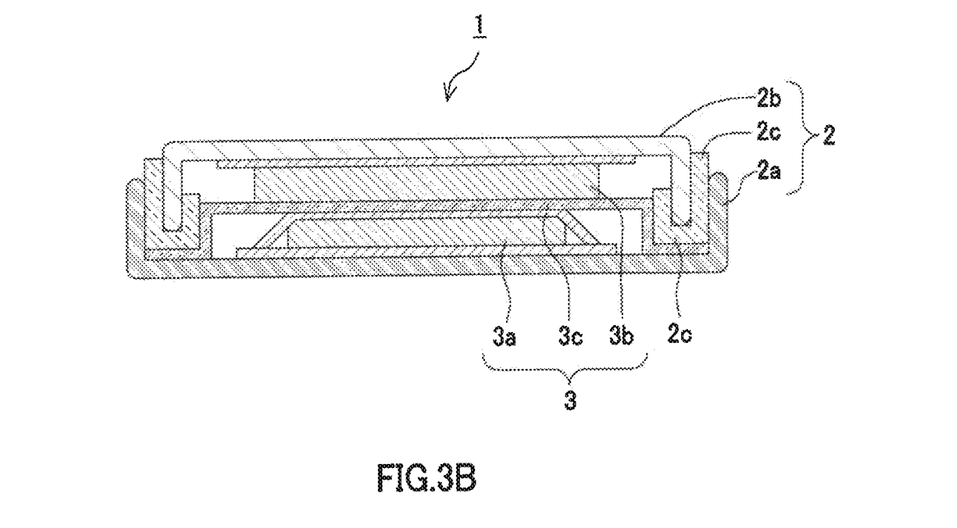

Explaining about an example applying non-aqueous electrolyte secondary battery relating to one embodiment of the present invention to a 2032 type coin battery, by using the drawings. FIGS. 3A and 3B are block diagrams of non-aqueous electrolyte secondary battery relating to one embodiment of the present invention, and FIG. 3A is a perspective view, and FIG. 3B is a sectional view along line A-A of FIG. 3A. The 2032 type coin battery 1 as illustrated in FIGS. 3A and 3B was produced by using the positive electrode active material obtained by examples 1 to 6 and comparative examples 1 to 4.

This 2032 type coin battery 1 comprises a case 2, and an electrode 3 contained in the case 2. The case 2 comprises a positive electrode can 2a, which is hollow and one end of which is opened, and a negative electrode can 2b arranged at an opening of the positive electrode can 2a, and the case 2 is configured to form a space to contain the electrode 3 between the negative electrode can 2b and the positive electrode can 2a, when the negative electrode can 2b is arranged at the opening of the positive electrode can 2a. The electrode 3 comprises a positive electrode 3a, a separator 3c, and a negative electrode 3b, and they are laminated to be aligned in this order. The electrode 3 is contained in the case 2 such that the positive electrode 3a contacts an inner surface of the positive electrode can 2a, and that the negative electrode 3b contacts an inner surface of the negative electrode can 2b.

In addition, the case 2 comprises a gasket 2c, and the positive electrode can 2a and the negative electrode can 2b are fixed to retain an electrically insulating state between the positive electrode can 2a and the negative electrode can 2b by the gasket 2c. Also, the gasket 2c is having a function to shut off inside of the case 2 from outside to be airtight and liquid-tight by sealing a gap between the positive electrode can 2a and the negative electrode can 2b.

This 2032 type coin battery 1 was produced as below. At first, 52.5 mg of positive electrode active material, 15 mg of acetylene black, and 7.5 mg of polytetrafluoroethylene (PTFE) resin were mixed, and formed to diameter 11 mm and thickness 100 μm by press-forming at a pressure of 100 MPa, to produce the positive electrode 3a. The produced positive electrode 3a was dried for 12 hours at 120° C. in a vacuum dryer. The coin type battery 1 was produced in a glove box of Ar atmosphere in which dew point was controlled to be −80° C., by using the positive electrode 3a, the negative electrode 3b, the separator 3c and electrolytic solution.

In addition, as the negative electrode 3b, a negative electrode sheet punched in disc shape with diameter of 14 mm and formed by copper foil applied with polyvinylidene fluoride and graphite powder with average particle diameter of about 20 μm was used. As the separator 3c, polyethylene porous film with film thickness 25 μm was used. As electrolytic solution, mixed solution with equal amount of diethyl carbonate (DEC) and ethylene carbonate (EC) with 1 M of $LiClO_4$ as supporting electrolyte (made by Tomiyama Pure Chemical Industries, Ltd.) was used.

A charge and discharge test was performed to the produced 2032 type coin battery as below. The produced 2032 type coin battery 1 was left for about 24 hours, and after open circuit voltage (OCV) has been stabilized, current density with respect to the positive electrode was made to 0.1 $mA/cm^2$ to be charged until cutoff voltage of 4.8 V, and after stopped for one hour, discharge capacity when discharged until cutoff voltage of 2.5 V was measured, and initial discharge capacity was found as battery capacity. At this time, multichannel voltage current generator (R6741A, made by Advantest Corporation) was used for measuring charge and discharge capacity.

(5) Evaluation of heat stability: The positive electrode active material was collected from the 2032 type coin battery after evaluation of battery characteristics, and the collected positive electrode active material was washed to remove electrolyte, and dried. Regarding the dried positive electrode active material, heat generation characteristic of the battery with respect to a temperature was measured as evaluation of heat stability, by using differential scanning calorimeter (DSC).

Figure 4:
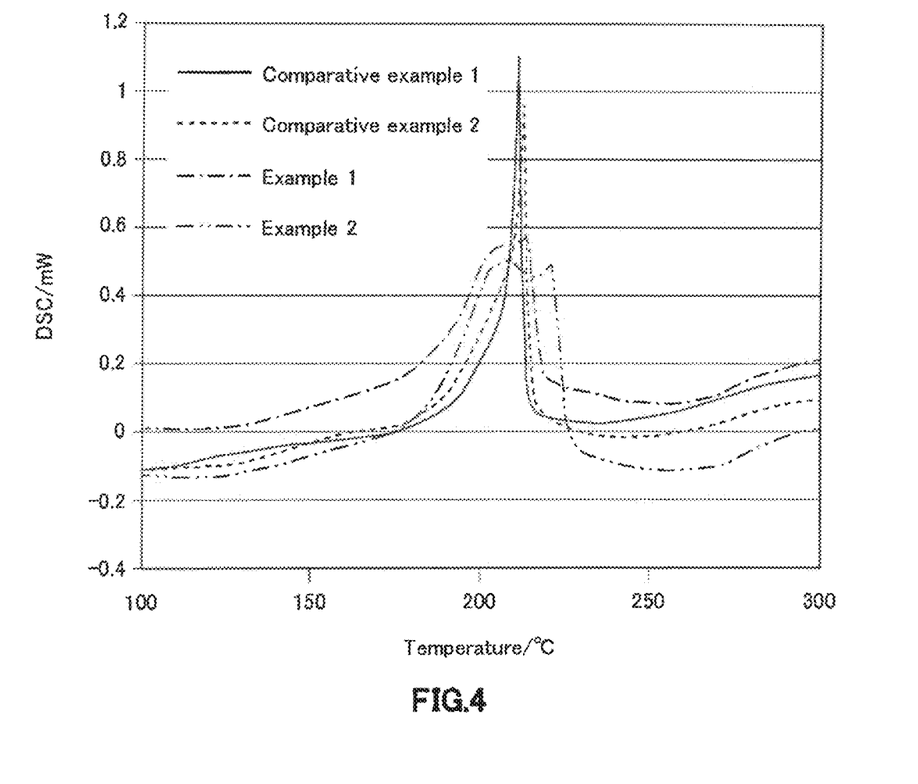
FIG. 4 is a diagram illustrating a result of DSC measurements in examples of the present invention and comparative examples.

For DSC measurement, differential scanning calorimeter (DSC3100SA, made by NETZSCH JAPAN K.K.) was used. A sample container, material of which was made of aluminum, was used, and a receiving plate of which was having diameter of 5 mm and height of 2.5 mm, and thickness of its lid body was 200 μm, and it was having one hole with a diameter of 400 μm at a center of the lid body. Constituent material of the positive electrode extracted by disassembling the battery after charging was filled in inside of sample receiving plate for 50% of inner capacity of the sample container, and outer periphery of the lid body was crimped and adhered to the receiving plate. Measuring atmosphere was in air, and rising temperature was 10° C./min, and measurements were performed from room temperature to 400° C. Heat stability was evaluated by half-value breadth (peak width of a value of DSC at intermediate of maximum value and background) and maximum value of DSC. FIG. 4 is a result of DSC measurement in the following examples and comparative examples.

Example 1

Nickel sulfate, cobalt sulfate, and boric acid were dissolved into ion exchanged water such that atomic ratio would be nickel:cobalt:boron=82.3:15.7:2.0, and 3 L of mixed aqueous solution of 2 mol/L was produced. 1 L of sodium hydroxide aqueous solution, pH of which on the basis of liquid temperature 25° C. was 13, was poured into the reaction vessel maintained at 50° C., and ammonia water was added such that ammonia concentration would be 10 mg/L. 40 ml of raw material solution, ammonia water, and sodium hydroxide aqueous solution were supplied into the reaction vessel, while maintaining temperature, pH, and ammonia concentration, and nuclei, which grow to form particles, were generated.

Then, pH on the basis of liquid temperature 25° C. was adjusted to 11.3, and remaining raw material solution, ammonia water, and sodium hydroxide aqueous solution were supplied in 4 hours, while maintaining temperature, pH, and ammonia concentration, and nickel composite hydroxide was crystallized. After solid-liquid separating crystallized nickel composite hydroxide by filtering, it was washed with sodium hydroxide aqueous solution and ion exchanged water, and dried to obtain nickel composite hydroxide, which would be a precursor of a positive electrode active material. Through crystallization, a position for supplying ammonia water and sodium hydroxide aqueous solution was located at one fifth of a distance between deepest part of stirring blade in reaction solution and liquid surface of reaction solution from deepest part of stirring blade, in vertical direction, and at intermediate position between a center and outermost periphery of stirring blade, in horizontal direction.

Next, the precursor was heated to 700° C. in air atmosphere, and heat treated by maintaining it for 6 hours, and converted into nickel composite oxide. Nickel composite oxide and lithium hydroxide were mixed to be a mixture such that a ratio (Li/Me) of a number of atoms of lithium to a sum of number of atoms of nickel, cobalt, and boron was 1.02. After temporarily calcining the obtained mixture for 4 hours at 500° C. in air atmosphere, it was calcined for 12 hours at 760° C. to obtain a positive electrode active material. Evaluation of DSC and initial discharge capacity of the obtained positive electrode active material were performed. Evaluation result is illustrated in Table 1.

Example 2

The positive electrode active material was obtained and evaluated as example 1, except that time for supplying raw material solution, ammonia water, and sodium hydroxide aqueous solution after generation of nuclei was changed to 2 hours, and that amount of raw materials to be supplied was changed to a half of the amount of example 1. Evaluation result is illustrated in Table 1.

Example 3

The positive electrode active material was obtained and evaluated as example 1, except that nickel sulfate, cobalt sulfate, and boric acid were dissolved into ion exchanged water such that atomic ratio would be nickel:cobalt:boron=82.7:15.8:1.5. Evaluation result is illustrated in Table 1.

Example 4

The positive electrode active material was obtained and evaluated as example 2, except that nickel sulfate, cobalt sulfate, and boric acid were dissolved into ion exchanged water such that atomic ratio would be nickel:cobalt:boron=82.7:15.8:1.5. Evaluation result is illustrated in Table 1.

Example 5

The positive electrode active material was obtained and evaluated as example 1, except that a position for supplying ammonia water and sodium hydroxide aqueous solution was located at one third of a distance between deepest part of stirring blade in reaction solution and liquid surface of reaction solution from deepest part of stirring blade, in vertical direction. Evaluation result is illustrated in Table 1.

Example 6

The positive electrode active material was obtained and evaluated as example 1, except that ammonia water and sodium hydroxide aqueous solution were supplied at liquid surface at a position one fourth of a distance between a center and outer periphery of liquid surface of reaction solution from outer periphery of liquid surface. Evaluation result is illustrated in Table 1.

Comparative Example 1

The positive electrode active material was obtained and evaluated as example 1, except that nickel sulfate and cobalt sulfate were dissolved into ion exchanged water such that atomic ratio would be nickel:cobalt=84.0:16.0, as prior art in which additive element was not added. Evaluation result is illustrated in Table 1.

Comparative Example 2

The positive electrode active material was obtained and evaluated as example 2, except that nickel sulfate and cobalt sulfate were dissolved into ion exchanged water such that atomic ratio would be nickel:cobalt=84.0:16.0, as prior art in which additive element was not added. Evaluation result is illustrated in Table 1.

Comparative Example 3

The positive electrode active material was obtained and evaluated as example 1, except that nickel sulfate, cobalt sulfate, and boric acid were dissolved into ion exchanged water such that atomic ratio would be nickel:cobalt:boron=83.2:15.8:1.0. Evaluation result is illustrated in Table 1.

Comparative Example 4

The positive electrode active material was obtained and evaluated as example 2, except that nickel sulfate, cobalt sulfate, and boric acid were dissolved into ion exchanged water such that atomic ratio would be nickel:cobalt:boron=83.2:15.8:1.0. Evaluation result is illustrated in Table 1.

TABLE 1

|  | Atomic ratio (excluding oxygen) | | | Particle diameter (D50) | Porosity | DSC maximum value | DSC half-value breadth | Initial discharge capacity |
| --- | --- | --- | --- | --- | --- | --- | --- | --- |
|  | Nickel | Cobalt | Boron | (µm) | (%) | (mW) | (° C.) | (mAh/g) |
| Example 1 | 82.3 | 15.7 | 2.0 | 8.4 | 8.201 | 0.578 | 23.4 | 198.8 |
| Example 2 | 82.3 | 15.7 | 2.0 | 5.9 | 9.681 | 0.503 | 24.0 | 195.9 |
| Example 3 | 82.7 | 15.8 | 1.5 | 8.1 | 10.119 | 0.427 | 26.9 | 199.4 |
| Example 4 | 82.7 | 15.8 | 1.5 | 5.9 | 10.003 | 0.401 | 26.2 | 198.6 |
| Example 5 | 82.3 | 15.7 | 2.0 | 8.4 | 8.420 | 0.533 | 23.8 | 199.4 |
| Example 6 | 82.3 | 15.7 | 2.0 | 8.3 | 8.257 | 0.561 | 23.3 | 199.2 |
| Comparative example 1 | 84.0 | 16.0 | 0.0 | 8.8 | 2.559 | 1.251 | 3.3 | 208.7 |
| Comparative example 2 | 84.0 | 16.0 | 0.0 | 5.3 | 2.511 | 1.102 | 3.7 | 208.0 |
| Comparative example 3 | 83.2 | 15.8 | 1.0 | 8.8 | 3.710 | 1.008 | 5.9 | 208.3 |
| Comparative example 4 | 83.2 | 15.8 | 1.0 | 6.4 | 1.364 | 0.966 | 6.2 | 208.1 |

In FIG. 4, a result of DSC measurements in examples 1 and 2 and in comparative examples 1 and 2 is illustrated. In examples 1 to 6 in which boron was added as additive element for more than 1.5 atomic percent, DSC maximum value was less than 0.8 mW, and DSC half-value breadth was 20° C. or more, while maintaining high value of initial discharge capacity of 195 mAh/g or more regardless of particle diameter, so it was confirmed that it is having high heat stability and gradual heat generation. Further, it can be understood that heat stability was improved significantly, as DSC maximum value of examples 1 to 6 was less than 0.6 mW, and it was about half a value compared to which of comparative examples 1 and 2 to which boron was not added.

On the other hand, in comparative examples 3 and 4 in which addition amount of boron was 1.0 atomic percent, DSC maximum value was decreased for about 10 to 25% compared to comparative examples 1 and 2 to which boron was not added, but DSC half-value breadth was about 6° C., so it is considered that it would generate heat in short time with respect to rise of temperature, and improvement of heat stability was insufficient.

Figure 5:
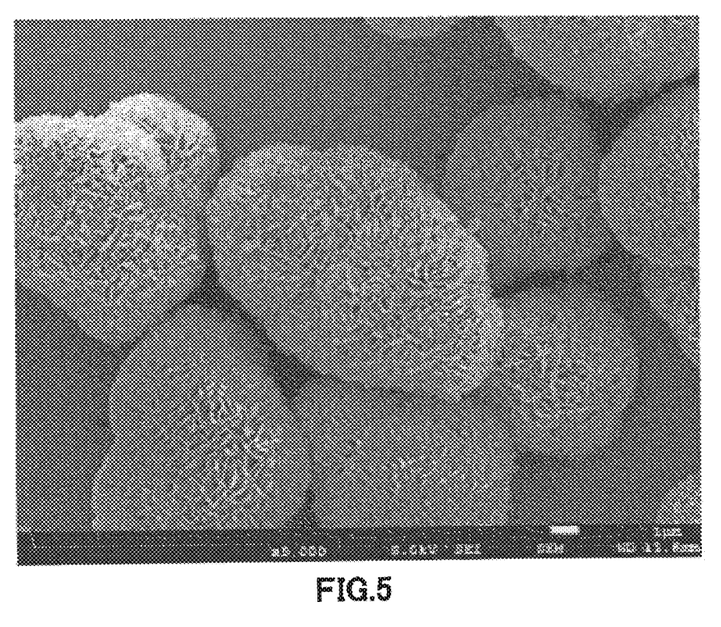
FIG. 5 is a scanning electron micrograph of a precursor of the positive electrode active material of example 1.
Figure 6:
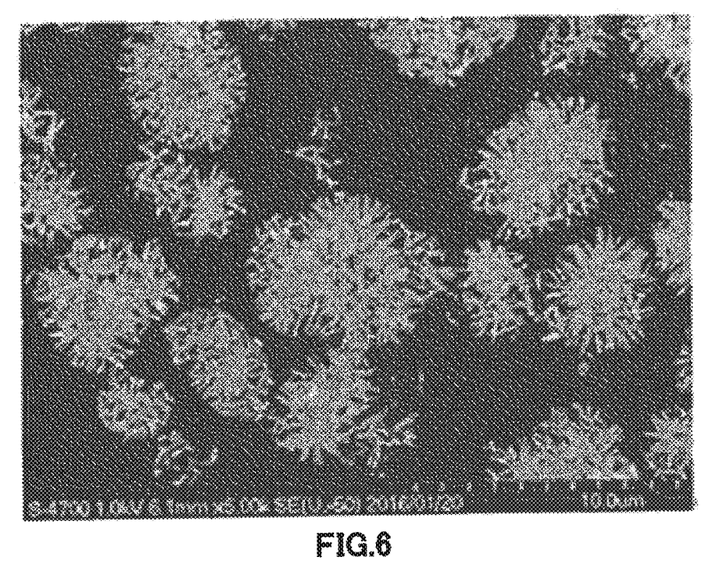
FIG. 6 is a scanning electron micrograph of cross section of the positive electrode active material of example 1.
Figure 7:
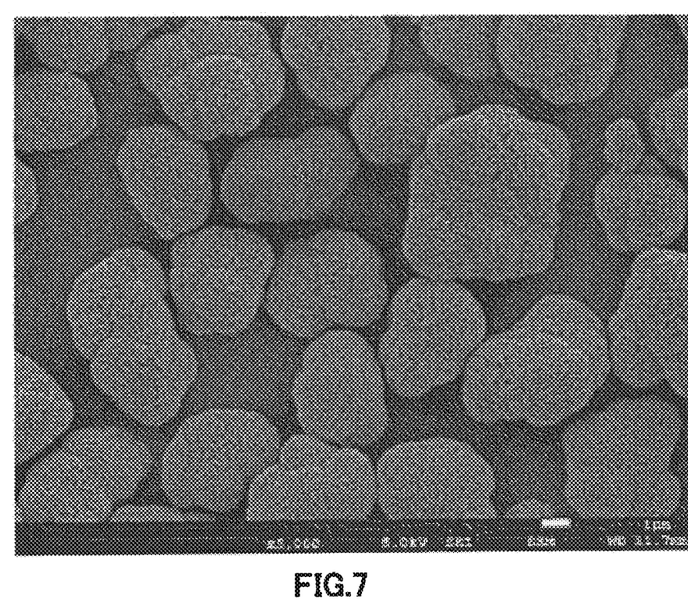
FIG. 7 is a scanning electron micrograph of a precursor of the positive electrode active material of comparative example 1.
Figure 8:
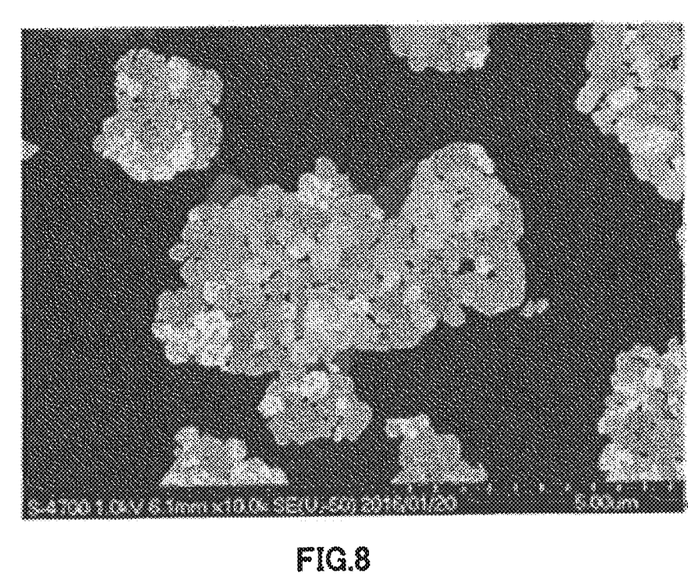
FIG. 8 is a scanning electron micrograph of cross section of the positive electrode active material of comparative example 1.

In addition, FIGS. 5 and 6 are scanning electron micrographs of a precursor of the positive electrode active material and the positive electrode active material of example 1, and FIGS. 7 and 8 are scanning electron micrographs of a precursor of the positive electrode active material and the positive electrode active material of comparative example 1. As can be seen from these drawings, it can be understood that the positive electrode active material for non-aqueous electrolyte secondary battery relating to one embodiment of the present invention, in which addition amount of boron with respect to a sum of metal element and additive element was more than 1.0 atomic percent and 6.0 atomic percent or less, is having a structure with a lot of gaps compared to which of comparative example 1 to which boron was not added.

The positive electrode active material for non-aqueous electrolyte secondary battery relating to one embodiment of the present invention is possible to inhibit high heat generation in short time while maintaining battery capacity, so it is suitable for non-aqueous electrolyte secondary battery for automobile, which requires high capacity and high safety. In addition, as it is having high capacity, it is also useful as the positive electrode active material of non-aqueous electrolyte secondary battery used as a power source of portable small equipment.

In addition, it is explained in detail about each embodiment and each example of the present invention as the above, but it can be understood easily for those who skilled in the art that various modifications are possible without practically departing from new matters and effect of the present invention. Therefore, all of such variants should be included in the scope of the present invention.

For example, terms described with different terms having broader or equivalent meaning at least once in description and drawings can be replaced with these different terms in any part of description and drawings. In addition, operation and configuration of the positive electrode active material for no-aqueous electrolyte secondary battery are not limited to those explained in each embodiment and each example of the present invention, and various modifications can be made.

GLOSSARY OF DRAWING REFERENCES

S11 Crystallization step
S12 Drying step
S13 Calcining step
1 Non-aqueous electrolyte secondary battery (2032 type coin battery)
2 Case
2a Positive electrode can
2b Negative electrode can
2c Gasket
3 Electrode
3a Positive electrode
3b Negative electrode
3c Separator
10 Reaction vessel
11 Stirring blade
12 Outer periphery
13 Supply tube
14 Shaft
$B_1$ Outermost periphery of stirring blade
$B_2$ Intermediate position of a center and outermost periphery of stirring blade
$B_3$ Outer periphery of liquid surface
$B_4$ Position at one third of a distance between a center and outer periphery of liquid surface from outer periphery of liquid surface
C Center (central axis)
$D_1$ Deepest part of stirring blade
$D_2$ Liquid surface
$D_3$ Position at one third of a distance between deepest part of stirring blade and liquid surface of reaction solution from deepest part of stirring blade
P Supply position
W Length of stirring blade
W' Distance between a center and outer periphery of liquid surface
L Distance between deepest part of stirring blade and liquid surface

The invention claimed is:

1. A positive electrode active material for non-aqueous electrolyte secondary battery containing lithium metal composite oxide composed of secondary particles formed by aggregated plate-like primary particles, comprising
lithium,
at least one metal element, and
at least one additive element,
wherein the lithium metal composite oxide has a crystal structure of layered rock salt structure and includes nickel as a metal element, and the nickel content is 60 to 90 atomic percent with respect to a sum of the metal element(s) and the additive element(s),
an additive element is at least boron, and the boron content is more than 1.0 atomic percent and 6.0 atomic percent or less with respect to the sum of the metal element(s) and the additive element(s),
a porosity of the secondary particles is 8% or more and 20% or less, and
half-value breadth of exothermic peak of the positive electrode active material is 20° C. or more, when measuring exothermic characteristics of non-aqueous electrolyte secondary battery with respect to temperature as evaluation of heat stability, using differential scanning calorimeter.

2. The positive electrode active material for non-aqueous electrolyte secondary battery according to claim 1, which includes cobalt as a metal element, and the cobalt content is 3 to 20 atomic percent with respect to the sum of the metal element(s) and the additive element(s).

3. The positive electrode active material for non-aqueous electrolyte secondary battery according to claim 1, wherein initial discharge capacity when it is used as the positive electrode active material of 2032 type coin battery is 195 mAh/g or more.

4. The positive electrode active material for non-aqueous electrolyte secondary battery according to claim 1, wherein the boron content is more than 1.2 atomic percent and 5.0 atomic percent or less with respect to the sum of the metal element(s) and the additive element(s).

5. The positive electrode active material for non-aqueous electrolyte secondary battery according to claim 1, wherein the boron content is more than 1.5 atomic percent and 3.0 atomic percent or less with respect to the sum of the metal element(s) and the additive element(s).

6. The positive electrode active material for non-aqueous electrolyte secondary battery according to claim 1, which includes at least one additional element selected from the group consisting of Co, Mn, Al, Mg, Si, Ti, Cr, Fe, Cu, Zn, Ca, V, Zr, Nb and W.

7. The positive electrode active material for non-aqueous electrolyte secondary battery according to claim 1, wherein the porosity is 8% or more and 15% or less.

8. The positive electrode active material for non-aqueous electrolyte secondary battery according to claim 1, wherein DSC maximum value when it is used as the positive electrode active material of 2032 type coin battery is less than 0.8 mW.

9. The positive electrode active material for non-aqueous electrolyte secondary battery according to claim 1, wherein a ratio (Li/Me) of number of atoms of lithium (Li) to a sum of number of atoms of the metal element and the additive element (Me) of the positive electrode active material is 0.98 to 1.09.

10. Non-aqueous electrolyte secondary battery, comprising a positive electrode including the positive electrode active material for non-aqueous electrolyte secondary battery according to claim 1.

11. A process for producing the positive electrode active material for non-aqueous electrolyte secondary battery according to claim 1, wherein the process comprising:
a crystallization step including a step that mixed aqueous solution containing a metal salt element, which includes at least nickel salt, and a boron compound as the additive element, and aqueous solution containing ammonium ion are mixed to be reaction solution, and that pH of the reaction solution based on a liquid temperature of 25° C. is controlled to be in a range of 11.0 to 12.5 using alkaline aqueous solution, and that, at that time, aqueous solution containing ammonium ion and alkaline aqueous solution are supplied into the reaction solution to grow particles of nickel composite hydroxide;

a drying step for drying crystallized the nickel composite hydroxide after washing it; and a calcining step for obtaining the lithium metal composite oxide by calcining in oxygen atmosphere a mixture obtained by mixing dried the nickel composite hydroxide and a lithium compound.

12. The process for producing the positive electrode active material for non-aqueous electrolyte secondary battery according to claim 11, wherein the mixed aqueous solution further contains cobalt as the metal element.

13. The process for producing the positive electrode active material for non-aqueous electrolyte secondary battery according to claim 11, wherein the boron content is 1.5 to 5 atomic percent with respect to the sum of the metal element and the additive element.

14. The process for producing the positive electrode active material for non-aqueous electrolyte secondary battery according to claim 11, wherein, in the crystallization step, concentration of the sum of the metal element and the additive element in the mixed aqueous solution is 1.5 to 2.5 mol/L.

15. The process for producing the positive electrode active material for non-aqueous electrolyte secondary battery according to claim 11, wherein, in the crystallization step, a position for supplying the aqueous solution containing ammonium ion and the alkaline aqueous solution is located between deepest part of stirring blade in the reaction solution and a position at one third of a distance between deepest part of the stirring blade and liquid surface of the reaction solution from deepest part of the stirring blade, in vertical direction, and located between outermost periphery of the stirring blade and an intermediate position of a center and outermost periphery of the stirring blade, in horizontal direction.

16. The process for producing the positive electrode active material for non-aqueous electrolyte secondary battery according to claim 11, wherein, in the crystallization step, a position for supplying the aqueous solution containing ammonium ion and the alkaline aqueous solution is located at liquid surface between outer periphery of liquid surface of the reaction solution and a position at one third of a distance between a center and outer periphery of liquid surface from outer periphery of liquid surface.

17. The process for producing the positive electrode active material for non-aqueous electrolyte secondary battery according to claim 11, wherein, in the calcining step, a calcining temperature is 650 to 950° C.

18. The process for producing the positive electrode active material for non-aqueous electrolyte secondary battery according to claim 11, wherein, in the calcining step, lithium hydroxide, lithium carbonate, or these mixture are used as the lithium compound.

* * * * *